Patented Sept. 3, 1929.

1,727,305

UNITED STATES PATENT OFFICE.

WARREN MOORE, OF NEW BRUNSWICK, AND HYYM E. BUC, OF ROSELLE, NEW JERSEY, ASSIGNORS TO STANDARD OIL DEVELOPMENT COMPANY, A CORPORATION OF DELAWARE.

INSECT REPELLENT.

No Drawing. Application filed April 20, 1928. Serial No. 271,644.

This invention relates to insect repellents comprising substances selected from the dialkyl phthalates and will be understood from the following description.

We have found that substances selected from the dialkyl phthalates are particularly efficacious in repelling insects of various kinds. For this purpose, we prefer to employ diethyl or dibutyl ester of phthalic acid although other substances in the group of dialkyl phthalates are efficacious. The material may be applied to the surface from which the insects are to be repelled, in any convenient manner, although we find it preferable to dissolve the material in a volatile solvent such as kerosene, to secure more uniform distribution. The solvent containing the repellent may then be applied in any suitable way although we find it particularly convenient to apply it by spraying. The proportions of phthalic ester and solvent may, of course, vary over wide limits, depending upon the duration of the effect desired. As a practical example, we find that three to ten grams of the ester dissolved in any suitable quantity of solvent, say for example, 100 grams of kerosene, and sprayed on to a domestic animal, such as a horse or cow, will provide substantially complete freedom from flies and the usual insect pests for a period exceeding twenty-four hours.

We claim:

1. An insect repellent comprising a substance selected from the dialkyl phthalates.

2. An insect repellent comprising a volatile solvent and a substance selected from the dialkyl phthalates.

WARREN MOORE.
HYYM E. BUC.